Patented Mar. 26, 1940

2,194,524

UNITED STATES PATENT OFFICE 2,194,524

WATER TREATMENT

Frederick K. Lindsay, La Grange, and David G. Braithwaite, Chicago, Ill., assignors to National Aluminate Corporation, Chicago, Ill., a corporation of Delaware No Drawing. Application March 27, 1937, Serial No. 133,376

8 Claims. (Cl. 210—23)

The present invention relates to an improved method for the removal of silica from water containing silica.

The object of the present invention is to provide a suitable method for the treatment of water containing quantities of silica (15 to 35 parts per million, or even higher) so that it will be satisfactory for boiler feed water use.

One of the objects of the invention is to treat water containing silica with a gelatinous precipitate of aluminum hydroxide or hydrate, prepared from a suitable soluble aluminum compound such as aluminum sulfate or sodium aluminate, and to provide a method for regenerating the aluminum hydrate so as to restore its silica-removing power.

Other objects are means for regenerating the aluminum hydrate and a cyclic method of continuously operating the process.

Most natural waters contain silica. In deep well water supplies the silica will usually be present in true solution, while water pumped from shallow surface wells or streams may contain silica in colloidal suspension as well as in true solution. The presence of silica in water to be used for boiler feed purposes is very undesirable, as it may react with any calcium present to form a hard, dense deposit of calcium silicate. If the silica content in boiler feed water is kept below 5 parts per million, the possibility of its concentration and subsequent precipitation as silicate scale is greatly reduced.

The lime-soda method of softening waters removes very little, if any, of the silica present, while the zeolite method of softening water usually adds to rather than diminishes the amount of silica present. The oxides of iron, aluminum, mixtures of the oxides of iron and aluminum, zinc and aluminum, and magnesium and aluminum, in the forms of "gels" which have been activated or dried under varying conditions, have been found to have some capacity for the removal of silica. These materials are preferably used as filter beds, and the water to be treated is percolated through the beds. A process such as that described in the patent to Liebknecht, No. 1,860,781, pertaining to the use of hardened gel oxides for the removal of silica from water, has been investigated. Owing to the limited initial capacities of these oxides and to the difficulties experienced in maintaining their regeneration cycles, these dried materials are not fully satisfactory in actual practice.

It has now been found that freshly precipitated aluminum hydroxide is effective for the removal of both soluble and suspended silica. One pound thereof (anhydrous basis) will remove approximately 2,000 grains of $SiO_2$. The aluminum hydroxide for this purpose may be prepared by any of the common methods: (1) by neutralizing a solution of a soluble aluminate to the phenolphthalein end point with acid; (2) by the neutralization of a solution of an aluminum salt to the phenolphthalein end point with alkali or ammonia; and (3) by the combining of a solution of an aluminate with a solution of an aluminum salt adjusted to a pH of approximately 8.0. The gelatinous precipitate thus prepared is removed from its mother liquor either by filtration or by allowing the precipitated gel to settle and decanting off the mother liquor. The use of the material is much simpler and its efficiency is at its maximum if the precipitate is not allowed to dry out to such an extent that it will not readily disperse in water. Washing of the precipitate is not necessary.

The following are typical examples of how this freshly precipitated aluminum hydrate may be prepared: 22 cc. of sodium aluminate solution (sp. gr. 1.65, containing 20% $Al_2O_3$ and 18.2% $Na_2O$) are diluted with 200 cc. of water. The $Al(OH)_3$ is precipitated from this solution by the addition of 16.0 cc. of concentrated hydrochloric acid (sp. gr. 1.18). The gelatinous precipitate is then separated from the resulting sodium chloride solution by filtration or by settling and decantation. The aluminum hydroxide may be made by the second method, by dissolving 42 grams of filter alum (aluminum sulfate containing approximately 17% $Al_2O_3$) in 300 cc. of water and neutralizing the alum solution with 19.0 cc. of caustic soda solution containing 50% NaOH. As an example of the third method, 13.8 cc. of sodium aluminate solution (sp. gr. 1.65) are diluted with 50 cc. of water and added to 250 cc. of alum solution containing 15.0 grams of filter alum. Regardless of the method used for precipitating the aluminum hydroxide, it is preferable to adjust the final pH of the mother liquor to approximately the phenolphthalein end point in order to obtain a product having the maximum capacity for silica absorption. It is generally recognized that the phenolphthalein end-point lies between pH 8 and 10, some authorities giving it more precisely as from 8.3 to 8.8

The following is one example of a method for applying this freshly precipitated aluminum hydrate material for the reduction of silica in a silica-bearing water. To one gallon of water, add the quantity of gelatinous aluminum hydrate prepared as above described. Agitate the material in order thoroughly to disperse it, allow the material to settle, and remove the treated water by decantation or filtration. This same gelatinous precipitate can then be used again for treating more silica-bearing water. In a typical experiment a quantity of precipitated aluminum hydroxide, as given above, was used in treating ten successive one-gallon quantities of water, containing 34 parts per million of $SiO_2$, before the silica content of the final gallon of the treated water exceeded 8 parts per million. After ten such cycles, the aluminum hydroxide was regenerated by the addition thereto of 2.0 cc. of caustic soda solution (sp. gr. 1.5, containing 50% NaOH) in 2,000 cc. of water. This caustic soda solution was agitated in contact with the gelatinous precipitate, the precipitate settled, and the supernatant liquid decanted. The excess NaOH remaining in the thus treated aluminum hydrate was neutralized by adding concentrated hydrochloric acid. This method of regeneration may be used three times, each regeneration permitting four additional cycles of silica removal.

This method may be adapted for large-scale operation by suitably increasing the quantities of material in proportion.

A further method for carrying out the present invention, particularly for continuous commercial operation, consists in forming aluminum hydroxide within the water, adding for each gallon to be treated certain definite quantities of materials capable of forming aluminum hydroxide. Following such a procedure, only about one-tenth of the amount of the aluminum hydroxide indicated in the above described method need be initially present, being augmented by an amount of aluminum hydroxide corresponding to approximately the normal coagulating dosage in proportion to the amount of water to be treated. Such a method may be carried out in a continuous manner, and under such conditions one pound of aluminum hydroxide (on the anhydrous basis) is capable of removing not less than 5000 grains of silica from water. This form of the invention may be carried out in accordance with the following example:

2.8 grams of aluminum chloride ($AlCl_3.6H_2O$) are dissolved in one gallon of a siliceous water containing 28 parts per million of silica, whereafter the resulting solution is neutralized to the phenolphthalein end point by means of 2.34 grams of hydrated lime (calcium hydroxide). To these materials there is then added, for each gallon of water present, and also for each succeeding gallon of water that is to be treated, 0.468 gram of aluminum chloride of the above formula and 0.39 gram of hydrated lime. In other words, each gallon of water receives the addition of an amount of aluminum hydroxide resulting from the interaction of 0.468 gram of aluminum chloride and 0.39 gram of hydrated lime. The precipitate from the preceding cycle (in the present case the original precipitate derived from the 2.8 grams of aluminum chloride) as well as the precipitate produced by the 0.468 gram of aluminum chloride, is agitated so as to be dispersed in the silica-bearing water for a period of about twenty-minutes. The aluminum hydroxide is then allowed to subside, and the thus treated water, which is now supernatant above the precipitate, is removed either by decantation or filtration. Twenty additional cycles can be run in this manner—that is, with the above mentioned amount of aluminum chloride and lime for each gallon of water added. The silica content of the decanted water under these conditions is always less than about 5.5 parts per million, having been reduced to that low point from the original 28 parts per million.

Obviously there will thus be a gradual increment in the amount of aluminum hydroxide which is floating about in the water in the form of precipitate sludge. After twenty cycles therefore, in order to prevent the undue accumulation of sludge, about 20% of the silica-bearing aluminum hydroxide sludge is bled off from the system, whereafter the process is continued with the addition of 0.468 gram of aluminum chloride and 0.39 gram of hydrated lime for each gallon of water that is to be treated. After a sufficient amount of precipitate has again accumulated, another 20% may be bled off. The precipitate which is bled off or removed from the mixture need not be wasted, because it may be used for the initial treatment of another batch of water in another tank, being augmented by the already mentioned addition of 0.468 gram of aluminum chloride and 0.39 gram of hydrated lime for each gallon of water that is to be treated.

The above figures are, of course, predicated upon water containing about 28 parts per million of silica and may be correspondingly altered if the water contains more or less silica. These figures are therefore purely exempletive and not in any sense limiting. Furthermore, if the water is somewhat different in composition, the amount of lime which is required to bring about the precipitation of the aluminum hydroxide may be either raised or lowered, but these adjustments are well within the skill of those familiar with water-treating problems.

The completeness of the silica elimination also will be a factor in the treatment, the main object being to bring about a substantially continuous operation by the addition of small amounts of materials capable of forming aluminum hydroxide, and running the water thus treated into a larger container in which there is already present precipitated aluminum hydroxide which may or may not already have adsorbed some silica.

The present invention must not be confused with the process of filtration, in which water is passed over hard but porous materials consisting of various metallic oxides.

It will be noticed that by carrying out the process according to the second method herein described it is not necessary to regenerate the aluminum hydroxide as is done in the first example given. Both forms of the invention, however, are considered to be a part of the original inventive concept, which may be summed up by stating that it involves the removal of silica from water by contacting the same with a freshly precipitated gelatinous precipitate of aluminum hydroxide of varying states of hydration.

Because of the fact that aluminum hydroxide is totally non-toxic and that it may be prepared at relatively low expense, the present process is very economical and safe in the case of waters intended for potable purposes, even though the primary object of the invention is to produce a water which will not form a strongly adherent siliceous scale in boilers or other evaporating equipment.

We claim:

1. The process of removing silica from silica-containing water which comprises mixing the water with gelatinous aluminum hydrate, agitating the mixture to cause adsorption of the silica by the hydrate, separating the water and the hydrate, and then treating the latter with sodium hydroxide to regenerate its silica-adsorbing power.

2. The process of removing silica from silica-containing water which comprises adding a precipitated gelatinous aluminum hydrate thereto to adsorb the silica and then separating the aluminum hydrate and the water, and regenerating the hydrate to restore its silica-adsorbing power.

3. A continuous process for removing silica from water which comprises forming therein a precipitate of aluminum hydroxide, adding further quantities of water thereto and for each unit volume of such water adding further quantities of an aluminum salt and an alkali, thus forming further quantities of aluminum hydroxide therein, allowing the resulting precipitate to accumulate in the combined original and added water for about twenty cycles, then removing about one-fifth of the precipitate, and thereafter continuing the process, removing desilicalized water after each subsidence of the precipitate during the operation of the process.

4. The process of claim 2 when carried out at a hydrogen-ion concentration approximately equal to that of the phenolphthalein end-point.

5. The process of claim 3 when carried out at a hydrogen-ion concentration approximately equal to that of the phenolphthalein end-point.

6. The process of claim 3 in which the alkali therein mentioned is lime.

7. A continuous process for removing silica from water which comprises forming therein a precipitate of fresh aluminum hydroxide, adding further quantities of water thereto, and for each unit volume of such water adding a sufficient quantity of an aluminum-containing compound and a compound capable of reacting therewith to form aluminum hydroxide in the proportions of at least one pound of aluminum hydroxide per 5000 grains of $SiO_2$ in the said unit volume of water, allowing the resulting precipitate to accumulate in the combined original and added water for a multiplicity of cycles, then removing a minor proportion of the precipitate and thereafter continuing the process, removing desilicalized water after each subsidence of the precipitate during the operation of the process.

8. The process of claim 7 when carried out at a hydrogen-ion concentration approximately equal to that of the phenol phthalein end point.

FREDERICK K. LINDSAY.
DAVID G. BRAITHWAITE.